Patented Oct. 13, 1942

2,298,514

UNITED STATES PATENT OFFICE 2,298,514

PRESERVATION OF GREEN FODDER

Friedrich Wilhelm Stauf and Georg Janning, Leverkusen-I. G. Werk, Germany, assignors to Winthrop Chemical Company, Inc., New York, N. Y., a corporation of New York No Drawing. Original application August 9, 1939, Serial No. 289,178. Divided and this application October 12, 1940, Serial No. 360,972. In Germany August 15, 1938

4 Claims. (Cl. 99—8)

This invention relates to improvements in the preservation of green fodder.

It is known to preserve green fodder by the addition of acids or sugar. The handling of acids is very difficult for the farmer; when using sugar there is lacking the sufficient security on silage.

It has now been found that nitrites (this term including also complex nitrites) represent excellent preserving agents for green fodder. Often quantities of far below 1% are sufficient to obtain a silage effect even with plants rich in albumen.

For instance, sodium nitrite, potassium nitrite, calcium nitrite or organic nitrites such as ethyl nitrite may be used for this purpose. Furthermore, complex nitrites, for instance, nitrito salts of heavy metals come into consideration. As suitable nitrites of course only those come into question in which the residue linked to the $NO_2$-group has no injurious effect on animals.

It is surprising that the $NO_2$-group can no longer be chemically detected in the forage after a few days. An injurious effect is therefore excluded.

The said nitrites may be used as green fodder preserving agents in the usual manner, for instance, by watering the green fodder with an aqueous solution of the nitrite compound. It has proved to be particularly advantageous to strew into the fodder to be stored dry preparations of the said compounds. By the last-mentioned manner of application the nitrites are suitably diluted with solid carriers in order to obtain a homogeneous distribution. As such diluents, for instance, inert carriers which act simultaneously as absorbents, such as diatomaceous earth, active carbon, silica, bleaching earths, such as fuller's earth come into question. Also mineral salts which are important for the nutrition of cattle, such as, for instance, non-acid reacting phosphates, chlorides or sulfates, as well as other agents suited as green fodder preserving agents, for instance, sugar or wood sugar, can be mixed with the nitrites to be used according to the present invention. The diluents and solvents for the nitrites have to be so chosen that the oxide of nitrogen is not prematurely freed from the nitrite.

It has further been found that by using nitrites particularly good results are obtained if the ensilage is performed in the simultaneous presence of ammonium ions.

Thus, for instance, ammonium nitrite may be used as green fodder preserving agent. Especially good results are obtained on silage when using mixtures of ammonium-free nitrites and ammonium salts.

The invention is illustrated by the following examples without, however, being restricted thereto:

Example 1

0.03% of sodium nitrite in aqueous solution are added in the usual manner to 1000 kgs. of freshly cut clover. After 3 weeks the silo is opened and a silage fodder with a pH=4.2, 1.93% of lactic acid and 0.50% of acetic acid is obtained. Neither nitrite nor nitrate could be detected in the fodder.

Example 2

A mixture of 2 kgs. of sugar and 0.3 kgs. of sodium nitrite is added to 1000 kgs. of freshly cut clover by strewing in the usual manner. After 6 weeks the silo is opened and a silage fodder with a pH=4.4, 1.59% of lactic acid and 0.42% of acetic acid is obtained. Nitrite and nitrate could not be detected in the forage.

Example 3

A mixture of 2 kgs. of calcium phosphate and 0.3 kg. of sodium nitrite is added to 1000 kgs. of freshly cut clover in a silo by strewing in the usual manner. After 6 weeks the silo is opened and a silage fodder with a pH=4.38, 1.50% of lactic acid and 0.46% of acetic acid is obtained.

This application is a division of application Serial No. 289,178, filed August 9, 1939.

We claim:

1. A composition for preserving green fodder comprising as its active ingredient a nitrite, the $NO_2$-group of which is linked to a physiologically innocuous radical.

2. A composition for preserving green fodder comprising as its active ingredient a water-soluble inorganic nitrite, the $NO_2$-group of which is linked to a physiologically innocuous radical.

3. A composition for preserving green fodder comprising nitrite the $NO_2$-group of which is linked to physiologically innocuous radical and a preponderant quantity of a solid carrier.

4. A composition for preserving green fodder comprising a water-soluble inorganic nitrite, the $NO_2$-group of which is linked to a physiologically innocuous radical and a preponderant quantity of a solid carrier.

FRIEDRICH WILHELM STAUF.
GEORG JANNING.